United States Patent
Fukano et al.

(10) Patent No.: US 7,216,843 B2
(45) Date of Patent: May 15, 2007

(54) PILOT-CONTROLLED ELECTROMAGNETIC VALVE SYSTEM

(75) Inventors: Yoshihiro Fukano, Yawara-mura (JP); Masayuki Oshima, Yawara-mura (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/911,102

(22) Filed: Aug. 4, 2004

(65) Prior Publication Data
US 2005/0072948 A1    Apr. 7, 2005

(30) Foreign Application Priority Data
Aug. 8, 2003    (JP)    ............................. 2003-206767

(51) Int. Cl.
*F16K 31/00*    (2006.01)
(52) U.S. Cl. ................................. 251/129.01
(58) Field of Classification Search ............ 251/129.01
See application file for complete search history.

(56) References Cited

U.S. PATENT DOCUMENTS

| | | | | |
|---|---|---|---|---|
| 2,061,768 | A | * | 11/1936 | Hossfeld .................... 24/135 R |
| 2,874,930 | A | * | 2/1959 | Ray et al. .................... 251/211 |
| 5,011,192 | A | * | 4/1991 | Campo ........................ 285/23 |
| 5,427,506 | A | * | 6/1995 | Fry et al. .................... 417/307 |
| 5,676,342 | A | * | 10/1997 | Otto et al. .................... 251/38 |
| 6,171,039 | B1 | * | 1/2001 | Seurujarvi .................. 411/148 |
| 6,176,256 | B1 | * | 1/2001 | Nakajima et al. ....... 137/505.12 |
| 6,786,690 | B1 | * | 9/2004 | Yamada ...................... 411/238 |

FOREIGN PATENT DOCUMENTS

| JP | 283324 | 10/2000 |
|---|---|---|
| JP | 250463 | 9/2002 |

OTHER PUBLICATIONS

English abstracts and computer translations are attached.

* cited by examiner

*Primary Examiner*—J. Casimer Jacyna
(74) *Attorney, Agent, or Firm*—Baker Botts LLP

(57) ABSTRACT

A pilot-controlled electromagnetic valve system has an electromagnetic valve block mounted on the top of a manifold block. A bearing surface is formed on the top of the electromagnetic valve block at a position adjacent to a screw accommodating recess formed on a joint surface at a side of the electromagnetic valve block. A washer engagement groove is formed at the bearing surface. An inwardly sloped washer having an engagement portion at the inner side thereof is fitted on a screw. The engagement portion is engaged with a side wall of the washer engagement groove. Thus, the electromagnetic valve block is surely secured to the manifold block with the screw even if the electromagnetic valve block is one at an end of a series of electromagnetic valve blocks constituting a valve manifold, or provided singly.

5 Claims, 3 Drawing Sheets

PILOT-CONTROLLED ELECTROMAGNETIC VALVE SYSTEM

BACKGROUND OF THE INVENTION

1. Field of the Invention

The present invention relates to a pilot-controlled electromagnetic valve system in which an electromagnetic valve block is secured to the top of a manifold block of a valve manifold.

2. Description of the Related Art

Japanese Patent Application Unexamined Publication (KOKAI) No. 2002-250463 (patent document 1) discloses a pilot-controlled electromagnetic valve system in which a multiplicity of electromagnetic valve blocks are mounted on a single manifold block (manifold base) in such a manner that each pair of adjacent electromagnetic valve block are joined together, and the electromagnetic valve blocks are secured to the manifold block by using screws. Japanese Patent Application Unexamined Publication (KOKAI) No. 2000-283324 (patent document 2) discloses an electromagnetic valve system in which a necessary number of electromagnetic valve block and manifold block combinations are provided in such a manner that each pair of adjacent combinations are joined together. A screw accommodating recess for allowing coexistence of a screw is formed on a joint surface at each side of each electromagnetic valve block to extend over from the upper end to the lower end of the joint surface. Each electromagnetic valve block is mounted on a manifold block and secured thereto by using a screw.

FIGS. 3A to 3D show an electromagnetic valve block 10 of the conventional valve manifold disclosed in the patent documents 1 and 2. In the valve manifold, two adjacent electromagnetic valve blocks 10 are jointly fastened with a single screw 11 with a view to minimizing the installation pitch of electromagnetic valve blocks 10. For jointly fastening purposes, a screw accommodating recess 13 for allowing coexistence of a screw 11 is formed on a joint surface 12 at each side of each electromagnetic valve block 10. The screw accommodating recess 13 has an approximately arcuate cross-sectional configuration and extends over from the upper end to the lower end of the joint surface 12. In addition, a bearing surface 15 is formed on the top 14 of the electromagnetic valve block 10 at a position adjacent to the screw accommodating recess 13. The bearing surface 15 is where the reverse side of the head of the screw 11 presses against the top 14 of the electromagnetic valve block 10. As shown in FIG. 3A, when a plurality of electromagnetic valve blocks 10 are disposed adjacently to each other, two mutually opposing screw accommodating recesses 13 of two adjacent joint surfaces 12 form an insertion hole 17 for a screw 11A. The screw 11A is inserted through the insertion hole 17, and the distal end of the screw 11A is threaded into a bolt hole (not shown) formed in a manifold block 16 (see FIG. 3C). Consequently, the abutting surface 18 (see FIG. 3D) on the reverse side of the head of the screw 11A presses against the bearing surface 15 of the electromagnetic valve block 10. Thus, the electromagnetic valve block 10 is secured to the manifold block 16. It should be noted that each electromagnetic valve block 10 is provided therein with a main valve (directional control valve), a manual control device, and a pilot valve in the order mentioned from the right-hand side of FIGS. 3A and 3B.

The above-described jointly fastened structure involves the following problem. The bearing surface 15 on the top 14 has an approximately hollow semicircular configuration as shown in FIGS. 3A and 3B. Therefore, when a screw 11 is applied in an insertion hole 17 where two adjacent electromagnetic valve blocks 10 contact each other, the abutting surface 18 of the screw 11 surely presses against the bearing surface 15. However, when only one electromagnetic valve block 10 is secured with a screw 11, or when an electromagnetic valve block 10 at an end of a series of electromagnetic valve blocks constituting a valve manifold is secured with a screw 11, if a strong external force acts rightward as shown in FIG. 3C, the screw 11 is likely to tilt toward the right-hand side where no electromagnetic valve block 10 is present. In such a case, the screw 11 may come off undesirably.

SUMMARY OF THE INVENTION

An object of the present invention is to provide a pilot-controlled electromagnetic valve system wherein an electromagnetic valve block is surely secured to a manifold block even if the electromagnetic valve block is one at an end of a series of electromagnetic valve blocks constituting a valve manifold, or provided singly.

To attain the above-described object, the present invention is applied to a pilot-controlled electromagnetic valve system including a manifold block and an electromagnetic valve block mounted on the top of the manifold block. A screw accommodating recess for allowing coexistence of a screw is formed on a joint surface at a side of the electromagnetic valve block to extend over from the upper end to the lower end of the joint surface. A bearing surface is formed on the top of the electromagnetic valve block at a position adjacent to the screw accommodating recess. The electromagnetic valve block is secured to the manifold block with the screw.

According to a first arrangement of the present invention, a washer engagement groove is formed at the bearing surface. An inwardly sloped washer having an engagement portion at the inner side thereof is fitted on the screw. The engagement portion is engaged with a side wall of the washer engagement groove.

According to a second arrangement of the present invention, the washer engagement groove in the first arrangement is formed in an area at the outer periphery of the bearing surface, and the engagement portion of the washer is engaged with a screw-side slant portion of the washer engagement groove.

According to a third arrangement of the present invention, the inwardly sloped washer in the first and second arrangements has a radially outer half and a radially inner half. The radially outer half is inwardly sloped deeper than the radially inner half. The engagement portion is formed by the inner surface of the radially outer half.

According to a fourth arrangement of the present invention, the washer in the first and second arrangements has a bowl-like curved configuration, and the engagement portion is formed by the inner side of a bowl-like curved portion of the washer.

According to a fifth arrangement of the present invention, the washer engagement groove in the first to third arrangements has an arcuate configuration as seen in a top view and a U-shaped or V-shaped sectional configuration.

In the pilot-controlled electromagnetic valve system according to the present invention, a washer engagement groove is formed at a bearing surface on the top of an electromagnetic valve block. An inwardly sloped washer having an engagement portion at the inner side thereof is fitted on a screw. The engagement portion is engaged with a side wall of the washer engagement groove. As the screw is tightened, the washer is deformed. Consequently, resilient force for preventing loosening of the washer occurs, thereby making it difficult for the washer from disengaging from the washer engagement groove. Accordingly, the electromagnetic valve block is surely secured to the manifold block even if the electromagnetic valve block is one at an end of a series of electromagnetic valve blocks constituting a valve manifold, or provided singly.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 3A to 3D are diagrams showing a conventional pilot-controlled electromagnetic valve system, of which:

FIG. 3A is a top view showing two adjacent electromagnetic valve blocks joined together;

FIG. 3B is a top view of a single electromagnetic valve block;

FIG. 3C is a sectional view taken along the line C—C in FIG. 3B; and

FIG. 3D is a diagram showing an abutting surface of a screw.

DESCRIPTION OF THE PREFERRED EMBODIMENTS

Figure 1A:
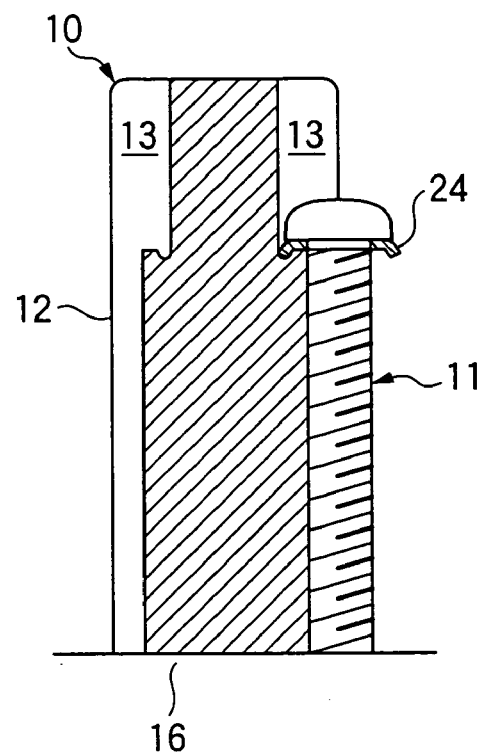
FIG. 1A is a sectional side view of an embodiment of the pilot-controlled electromagnetic valve system according to the present invention.

FIGS. 1A to 2B show an embodiment of the pilot-controlled electromagnetic valve system according to the present invention. In FIGS. 1A to 2B, the same members or portions as those in FIGS. 3A to 3D are denoted by the same reference numerals as in FIGS. 3A to 3D, and a description thereof will be given briefly.

The feature of the embodiment of the present invention is as follows. A washer engagement groove 20 is formed at each bearing surface 15. An inwardly sloped washer 24 having an engagement portion 25 at the inner side thereof is fitted on a screw 11. The engagement portion 25 of the washer 24 is engaged with a side wall of the washer engagement groove 20. It should be noted that the washer 24 is made from a ring formed by boring an insertion hole in the center of a disk. The ring is formed into an approximately umbrella-like configuration, for example. The lower side of the approximately umbrella-like washer 24 is defined as the inner side.

Figure 1B:
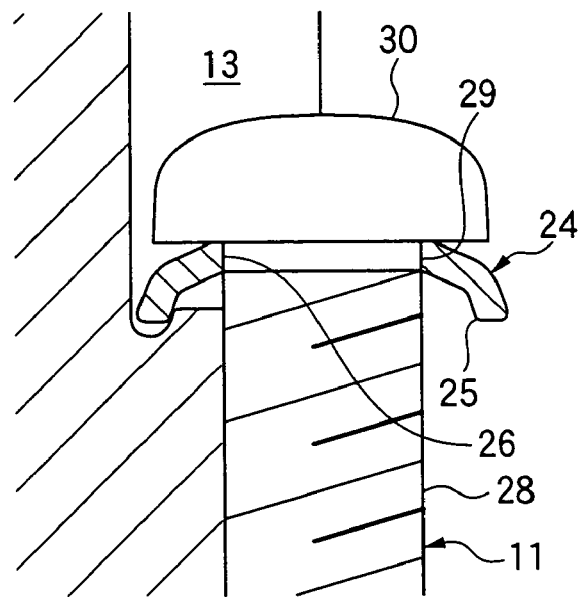
FIG. 1B is an enlarged view of an essential part of FIG. 1A.
Figure 1C:
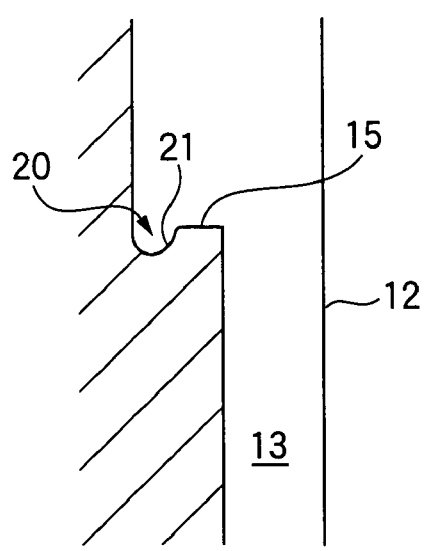
FIG. 1C is an enlarged view of a part of FIG. 1B.
Figure 1D:
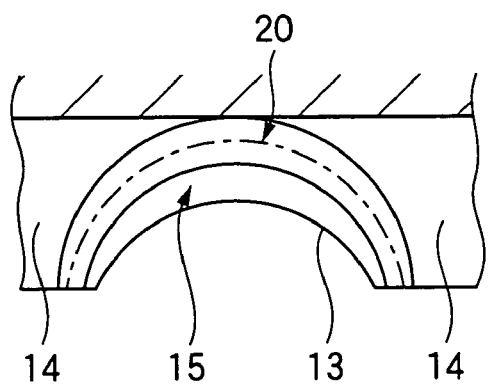
FIG. 1D is an enlarged top view of FIG. 1C.
Figure 3A:
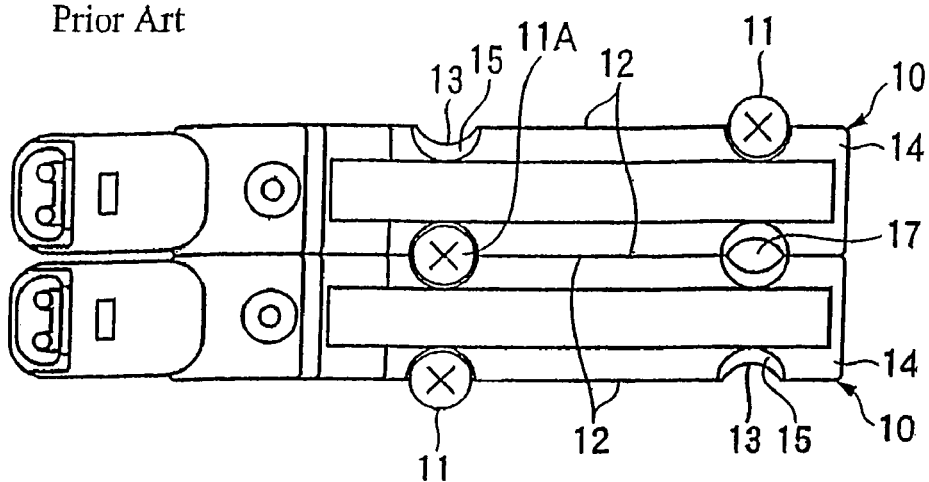
Figure 3B:
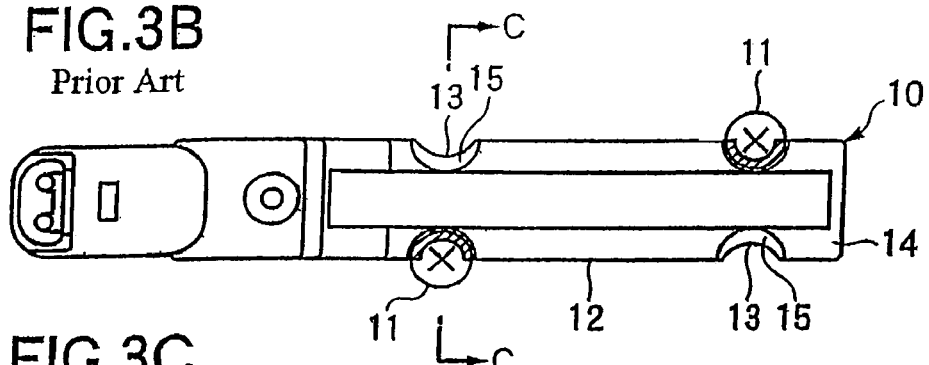
Figure 3C:
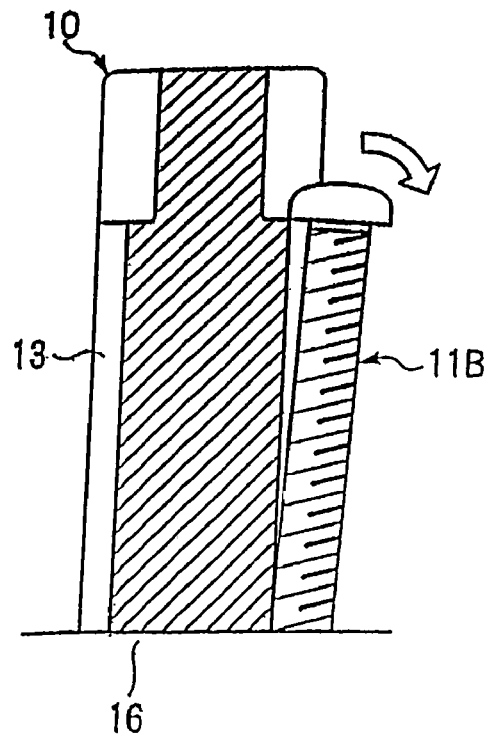
Figure 3D:
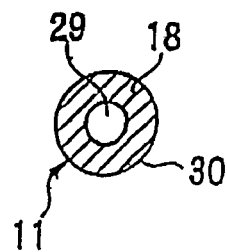

As will be understood from a comparison of FIGS. 1D and 3B, the washer engagement groove 20 is formed in an area at the outer periphery of the bearing surface 15 in the prior art (i.e. at a position contiguous with or separate from the outer periphery of the bearing surface 15). The sectional configuration of the washer engagement groove 20 is a U-shape, a V-shape, or a configuration closely resembling either of them. The configuration of the washer engagement groove 20 as seen in a top view is preferably an arcuate configuration having a predetermined width. The washer engagement groove 20 as shown in FIG. 1C has a sectional configuration in which the opening is widened, and the right-hand slant portion of the washer engagement groove 20 is a screw-side slant portion 21. The engagement portion 25 of the washer 24 is engaged with the screw-side slant portion 21. It should be noted that the screw-side slant portion 21 may be made to extend vertically. In FIG. 1C, an engaging force acting on the screw-side slant portion 21 in a downwardly rightward direction is supported by a thick-walled portion underneath the bearing surface 15.

The washer 24 is sloped inwardly as shown in FIG. 1B. More specifically, the washer 24 consists essentially of a radially outer half and a radially inner half (exclusive of the insertion hole 26). The radially outer half is inwardly sloped deeper than the radially inner half. A hook-like engagement portion 25 is formed by a portion of the inner surface of the radially outer half in the vicinity of the outer peripheral portion thereof. The threaded portion 28 of the screw 11 is inserted through the insertion hole 26 of the washer 24. In actual use, the insertion hole 26 is located at a shank 29 of the screw 11 that extends between the screw head 30 and the threaded portion 28. With a view to increasing the efficiency of the operation of securing the electromagnetic valve block 10, it is preferable for the insertion hole 26 of the washer 24 to have such a size that the washer 24 as fitted on the screw 11 will not move by gravity. It should be noted that the washer 24 may have an approximately bowl-like curved configuration. In such a case, the engagement portion 25 is formed by the inner side of an approximately bowl-like curved portion of the washer 24.

The way to use the embodiment of the present invention will be explained below. The engagement portion 25 of the washer 24 fitted on the screw 11 is engaged with the screw-side slant portion 21 of the washer engagement groove 20 on the electromagnetic valve block 10, and the screw 11 is threaded into a bolt hole in the manifold block. As the screw 11 is tightened, the washer 24 is deformed. Consequently, resilient force arises from the washer 24 trying to return to its original configuration. The resilient force acts toward the screw-side slant portion 21 of the washer engagement groove 20, thus preventing the washer 24 from becoming loose. Accordingly, the electromagnetic valve block 10 is surely secured to the manifold block. It is very difficult to disengage the washer 24 from the washer engagement groove 20 by external force because the engagement portion 25 of the washer 24 is engaged with the screw-side slant portion 21 of the washer engagement groove 20 and the resilient force of the washer 24 is acting on the screw-side slant portion 21.

Figure 2A:
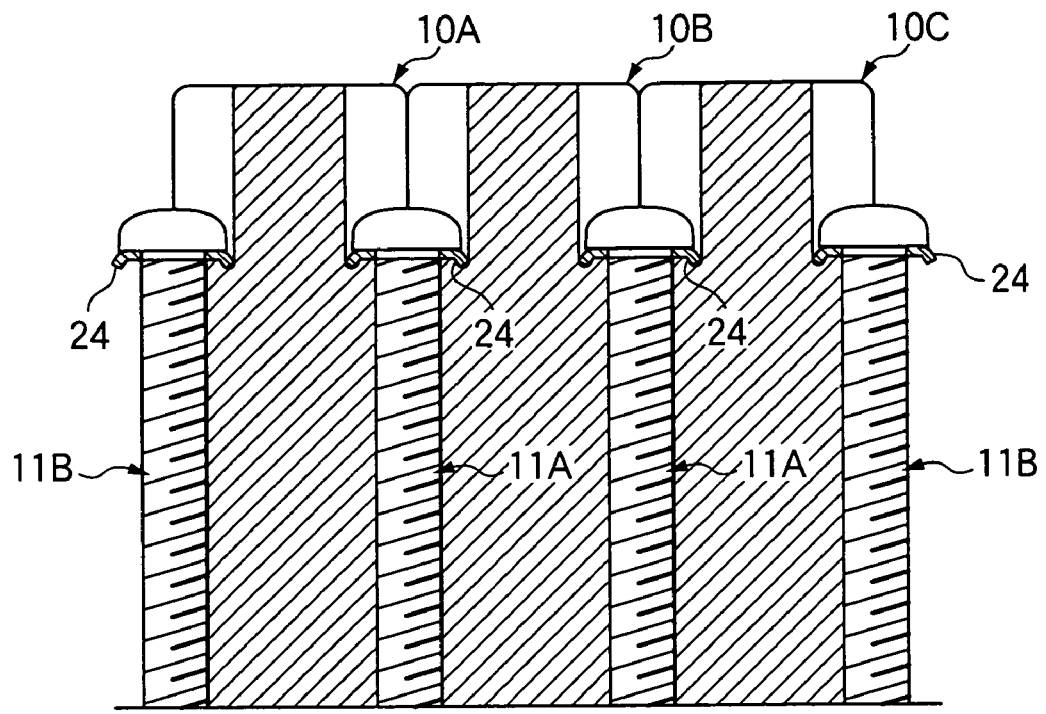
FIG. 2A is a sectional view showing electromagnetic valve blocks as jointly fastened with screws.

FIG. 2A shows an example of a small pitch type system in which three electromagnetic valve blocks 10A to 10C are secured to a manifold block in such a manner that each pair of adjacent electromagnetic valve blocks are joined together. Inner two screws 11A are each used to jointly fasten a pair of adjacent electromagnetic valve blocks. Outer two screws 11B are installed as follows. An engagement portion 25 at one side of a washer 24 is engaged with the screw-side slant portion 21 of the washer engagement groove 20 on the electromagnetic valve block 10A or 10C. Thus, all the electromagnetic valve blocks are surely secured to the manifold block.

Figure 2B:
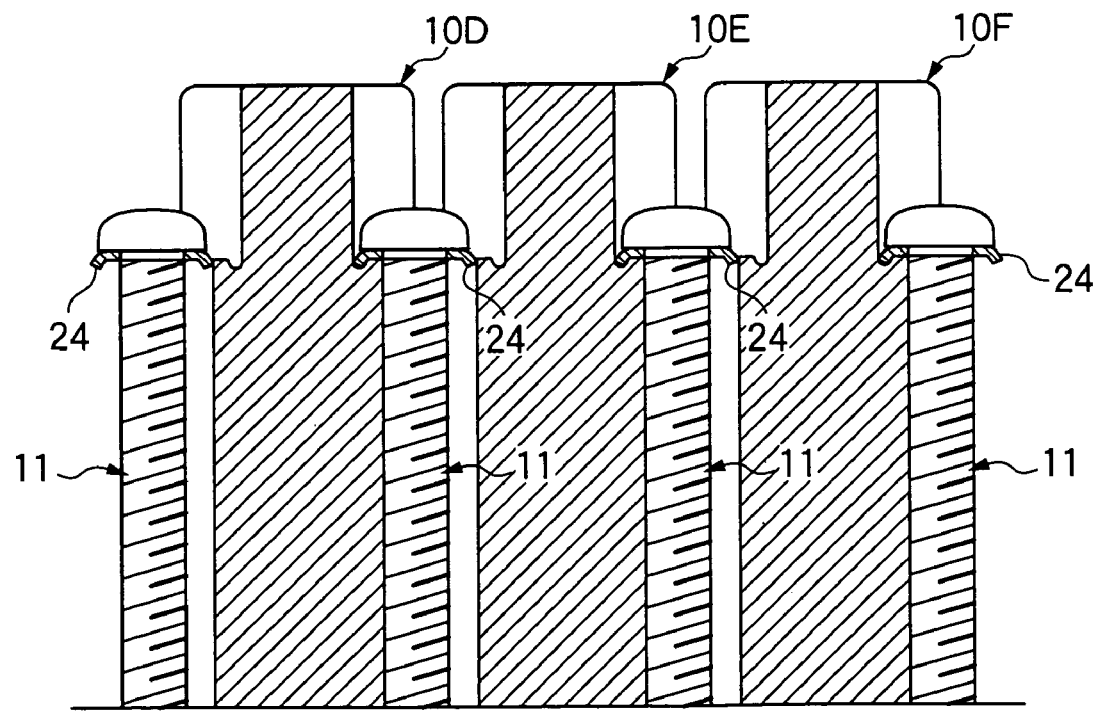
FIG. 2B is a sectional view showing electromagnetic valve blocks as individually fastened with screws.

FIG. 2B shows an example of a wide pitch type system in which three electromagnetic valve blocks 10D to 10F are disposed on a wide-pitch manifold block at predetermined intervals, and each electromagnetic valve block is fastened individually. Each of the electromagnetic valve blocks 10D to 10F is secured to the manifold block with a single screw 11 and a single washer 24.

The wide-pitch manifold block shown in FIG. 2B is applied to a system in which the outer diameter of a joint connected to an output port of each electromagnetic valve block 10 to an air cylinder is larger than the width of the electromagnetic valve block 10. In the individually fastened structure shown in FIG. 2B, when one electromagnetic valve block 10 needs to be replaced during maintenance, it can be replaced simply by removing only the screw 11 fastening the electromagnetic valve block 10 to be replaced. Therefore, the individually fastened structure is more advantageous in terms of maintenance than the jointly fastened structure shown in FIG. 2A.

It should be noted that the present invention is not limited to the foregoing embodiments but can be modified in a variety of ways.

What is claimed is:

1. In a pilot-controlled electromagnetic valve system comprising:
    a manifold block;
    an electromagnetic valve block mounted on a top of the manifold block;
    a screw accommodating recess for allowing coexistence of a screw that is formed on a joint surface at a side of the electromagnetic valve block to extend over from an upper end to a lower end of the joint surface; and
    a bearing surface formed on the top of the electromagnetic valve block at a position adjacent to the screw accommodating recess;
    wherein the electromagnetic valve block is secured to the manifold block with the screw;
    the improvement which comprises:
        a washer engagement groove formed at said bearing surface; and
        an inwardly sloped washer fitted on said screw, said washer having a substantially uniform thickness and an engagement portion at an inner side thereof;
        wherein the engagement portion is engaged with a side wall of said washer engagement groove.

2. A pilot-controlled electromagnetic valve system according to claim 1, wherein said washer engagement groove is formed in an area at an outer periphery of said bearing surface, and the engagement portion of said washer is engaged with a screw-side slant portion of said washer engagement groove.

3. A pilot-controlled electromagnetic valve system according to claim 1, wherein said washer has a bowl-like curved configuration, and said engagement portion is formed by an inner side of a bowl-like curved portion of said washer.

4. A pilot-controlled electromagnetic valve system according to claim 1, wherein said washer engagement groove has an arcuate configuration as seen in a top view and a U-shaped or V-shaped sectional configuration.

5. A pilot-controlled electromagnetic valve system comprising:
    a manifold block;
    an electromagnetic valve block mounted on a top of the manifold block;
    a screw accommodating recess for allowing coexistence of a screw that is formed on a joint surface at a side of the electromagnetic valve block to extend over from an upper end to a lower end of the joint surface; and
    a bearing surface formed on the top of the electromagnetic valve block at a position adjacent to the screw accommodating recess;
    wherein the electromagnetic valve block is secured to the manifold block with the screw;
    the improvement which comprises:
        a washer engagement groove formed at said bearing surface; and
        an inwardly sloped washer fitted on said screw, said washer having an engagement portion at an inner side thereof;
        wherein the engagement portion is engaged with a side wall of said washer engagement groove;
        wherein a radially outer half of the inwardly sloped washer is inwardly sloped deeper than a radially inner half of said washer, and said engagement portion is formed by an inner surface of said radially outer half.

* * * * *